United States Patent [19]

Gourse

[11] Patent Number: 5,598,437
[45] Date of Patent: Jan. 28, 1997

[54] MULTICHANNEL FREQUENCY AND PHASE VARIABLE RADIO FREQUENCY SIMULATOR

[75] Inventor: Stanley J. Gourse, Highland, Md.

[73] Assignee: Litton Systems, Inc., Woodland Hills, Calif.

[21] Appl. No.: 92,610

[22] Filed: Jul. 16, 1993

[51] Int. Cl.⁶ ........................................... H04L 27/18
[52] U.S. Cl. ........................ 345/308; 375/279; 327/106; 364/718
[58] Field of Search ................ 375/67.52; 364/718, 364/721; 328/14, 63, 155; 332/16 R, 117, 144; 307/262, 269; 327/106

[56] References Cited

U.S. PATENT DOCUMENTS

| | | | |
|---|---|---|---|
| 3,629,715 | 12/1971 | Brows | 375/67 |
| 3,973,209 | 8/1976 | Nossen et al. | 364/721 |
| 4,134,072 | 1/1979 | Bolger | 364/721 |
| 4,331,941 | 5/1982 | Kovawck et al. | 328/168 |
| 4,454,480 | 6/1984 | Hassun et al. | 375/67 |
| 4,648,060 | 3/1987 | Allen et al. | 364/718 |
| 4,652,832 | 3/1987 | Jasper | 364/721 |
| 4,752,902 | 6/1988 | Goldberg | 364/721 |
| 4,951,237 | 8/1990 | Essenwanger | 364/721 |
| 4,998,072 | 3/1991 | Sheffer | 364/718 |
| 5,027,372 | 6/1991 | Weng | 375/67 |

Primary Examiner—Stephen Chin
Assistant Examiner—T. Ghebretinsae
Attorney, Agent, or Firm—Gerald L. Lett

[57] ABSTRACT

A multichannel frequency phase variable signal source is described having particular application in the simulation of an emitter environment for testing interferometer receivers. An improved direct digital frequency synthesizer produces phase information for initiating the operation of a related frequency synthesizer at a different phase point from those of the remainder of the synthesizers forming the multi channel source. An improved direct digital frequency synthesizer is described for varying this phase information.

1 Claim, 5 Drawing Sheets

MULTICHANNEL FREQUENCY AND PHASE VARIABLE RADIO FREQUENCY SIMULATOR

FIELD OF THE INVENTION

This invention relates to means for generating multiple radio frequency ("RF") source, the frequencies of which are the same, but which have relative phases which can be varied in a precise manner. The invention has particular application for simulating an RF environment for testing interferometer-type receivers.

BACKGROUND OF THE INVENTION

Interferometer type receivers are widely used for locating, for example, hostile radar emitters from, for example, a moving platform. Typical RF interferometer systems include a plurality of antennas with which an emitter is located by utilizing the phase differences between the signals arriving at the different antennas. In the design and development of such systems the question is raised, of course, as to how they should be tested. Previously, testing such systems in a laboratory has been, at best, awkward. It has been necessary to simulate the different phase shifts to be seen by each antenna using differing lengths of transmission line. Usually, only one set of lines was used simulating only one emitter at a predetermined azimuth.

Developments in the digital generation of signals, particularly in the 0 to 300 MHz range have created important new possibilities for laboratory testing of interferometer type receiver systems. It is now possible using digital techniques to generate signals wherein a given phase of an output signal may be started at any arbitrary point and changed virtually instantaneously. More than one such device can be driven from a common reference frequency, and the phase of each output can be set independently while being locked to the phase of the common reference source. These devices are known as direct digital frequency synthesizers ("DDFS") and can be incorporated in microwave synthesizers allowing virtually any frequency to be generated having the phase locking characteristics described.

SUMMARY OF THE INVENTION

It is therefore, an object of this invention to provide a means by which direct digital frequency synthesizers can be phase shifted whereby a frequency of operation phase locked to other sources can be maintained.

It is another object of this invention to provide a means for simulating the radio frequency environment to be experienced by an interferometer type receiver so as to simulate the many emitters at any azimuth and at any frequency on a real time basis.

The foregoing and other objects are obtained by, firstly, inserting an additional digital adder circuit before the memory in a prior art DDFS (to be described below) to digitally cause precise phase shifts in the output of the DDFS while leaving the frequency unchanged.

In order to simulate an RF environment for purposes of, for example, testing interferometer type receivers an assembly of frequency synthesizers is provided in accordance with the number of antennas being used on the interferometer. A phase variable DDFS, according to the principles of the invention, is an integral part of each synthesizer, and this allows the phase variation to be impressed on the output frequency of each. Since all synthesizers are referenced to the same clock frequency, all outputs will be phase locked, and the desired phase relationships between the respective outputs will be maintained.

BRIEF DESCRIPTION OF THE DRAWINGS

The manner in which the foregoing objects are obtained will be apparent from the following detailed description of a preferred embodiment with reference to the drawings in which.

DETAILED DESCRIPTION OF THE PREFERRED EMBODIMENT

Figure 1:
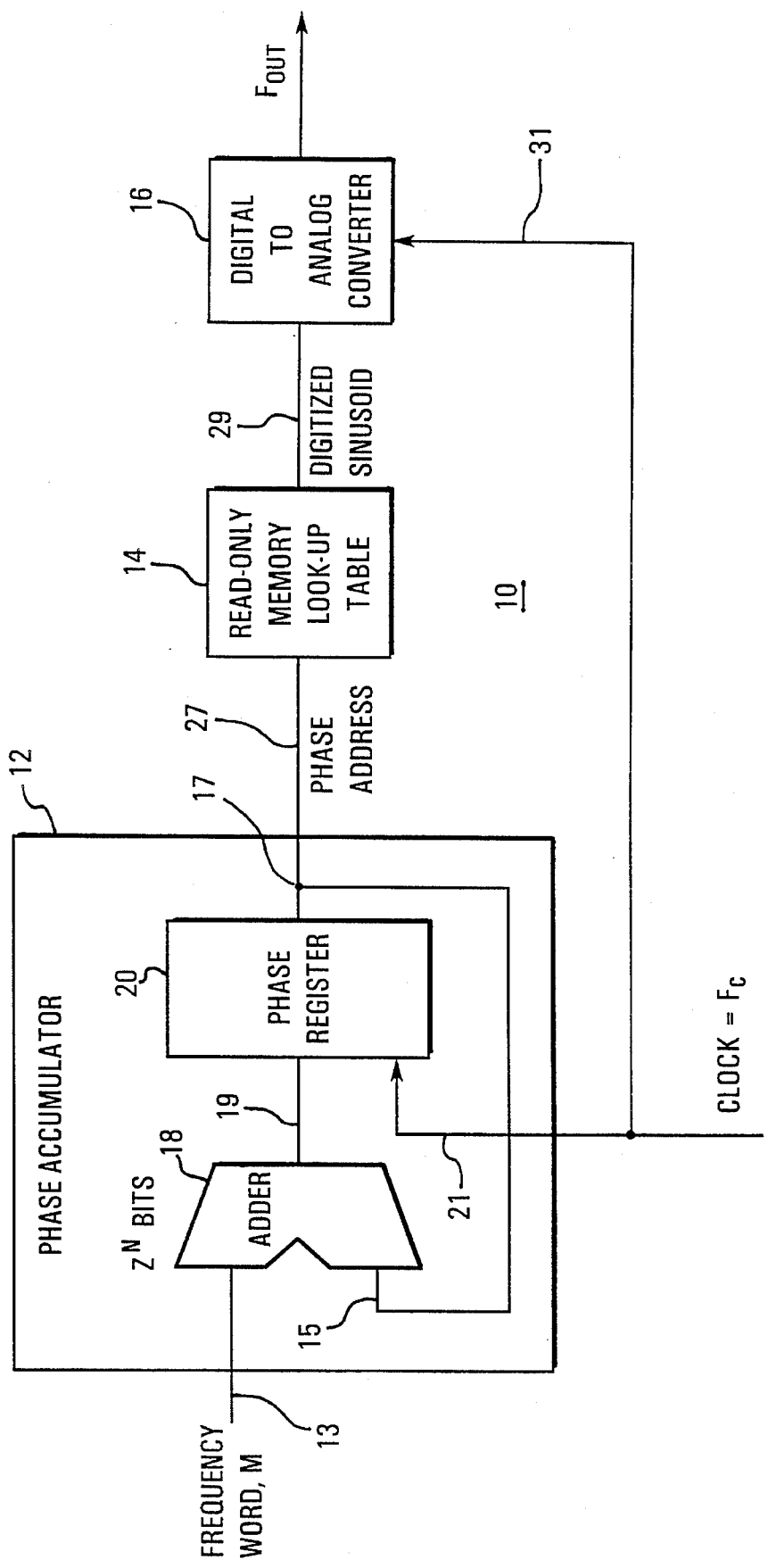
FIG. 1 is a block schematic diagram of a prior art direct digital frequency synthesizer.

FIG. 1 is a block schematic diagram of a DDFS constructed according to known principles. The DDFS 10 includes a device known as a phase accumulator 12 which functions as a high speed, high resolution arithmetic logic unit; a memory circuit 14 in the form of a read only memory forming a "look up" table and a digital to analog converter 16.

A digital frequency word M is generated in any one of a number of the well known ways and is applied to input terminal 13 of phase accumulator 12. The latter input terminal is also one of the input terminals to a digital adder 18. The output of adder 18 is supplied to a phase register 20 by means of adder output 19.

The output terminal 17 of phase accumulator 12 supplies a digital phase address from phase register 20 which, as well, is returned to the second input of adder 18 via line 15. Phase register 20 is synchronized with a reference frequency source by a clock input 21.

As stated, the digital word M designates a predetermined output frequency. With every clock cycle, this word is added to the output of the phase accumulator 12 thus generating another digital word that increases by M after each clock cycle. The binary phase register 20 thus increased produces a digital word at output terminal 17 which is a phase address corresponding with a predetermined location in memory 14. Each location in the latter memory corresponds with a value of a sinusoid at the phase designated by the phase address.

Figure 2:
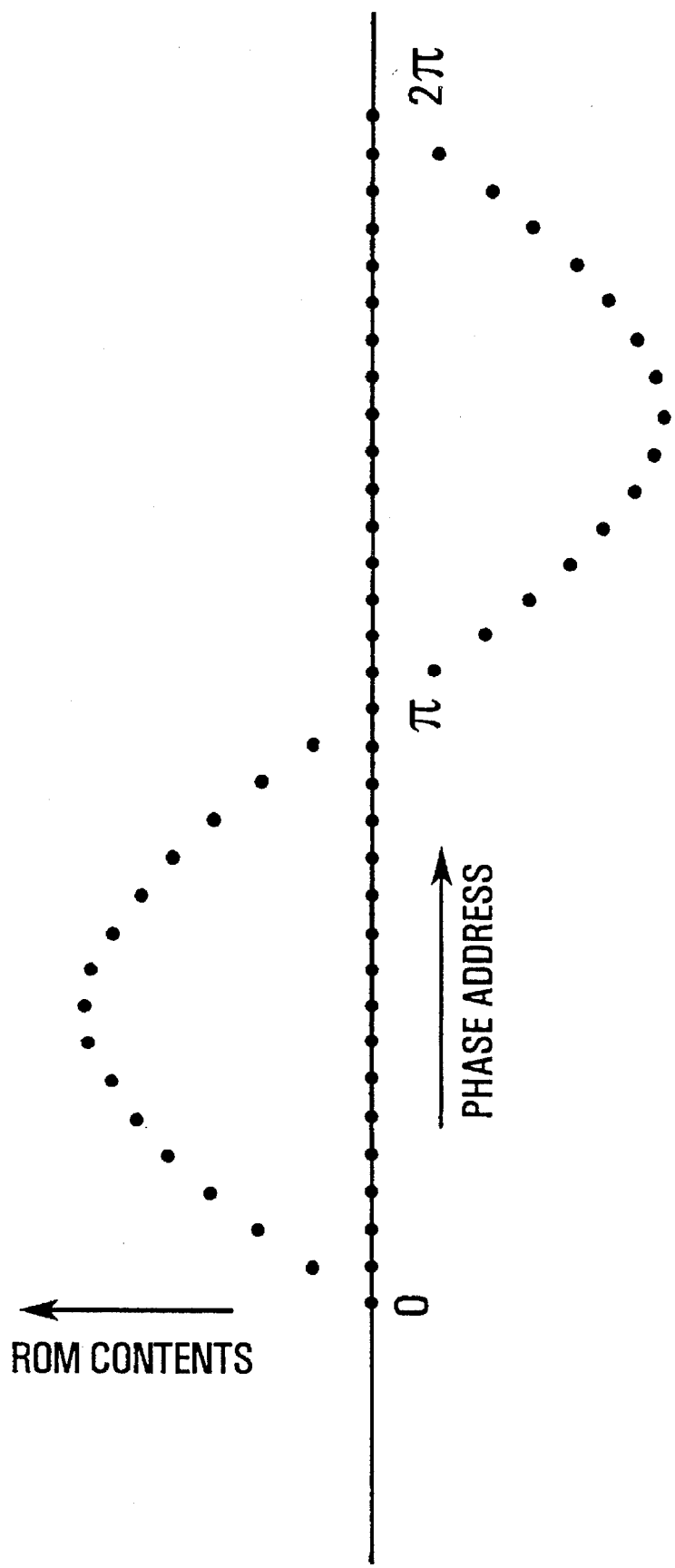
FIG. 2 is a wave form diagram illustrating the operation of the FIG. 1 DDFS.

The diagram in FIG. 2 illustrates how the contents of the memory 14 are a function of phase. Since the phase of the sinusoid is changing every clock cycle by a fixed amount set by the input frequency word M, and since frequency is the rate of change of phase, a unique output frequency is generated for every value of M and for every value of clock period.

The reference source (not shown) may be any form of source of precise and accurate dock signals. Thus, the only variable is the input frequency word M. When the latter is changed so as to generate a new frequency, the phase accumulator output, which is representative of phase, constructs the new frequency starting at the last point on the previous frequency signal. Thus, the two frequencies are phase continuous. The output frequency can be described by the equation:

$$Fo = Fc \frac{M}{2^N}$$

where Fo is the desired frequency output; Fc is the clock frequency; M is the input frequency word ($1<M<2^{N-1}$) and N is the number of bits in the phase accumulator. In practice Fc is on the order of several hundred MHz and N is from 16 to 32. Note that extremely high resolution can be obtained from a DDFS, i.e., $$\frac{1}{2^{32}}$$

times the reference frequency is possible.

Returning to FIG. 1, the DDFS generates the analog output frequency by supplying a digital word corresponding with the digitized sinusoid generated as described above to a conventional digital to analog converter 16 which produces the desired frequency output synchronously with the clock signal as supplied via line 31.

Figure 3:
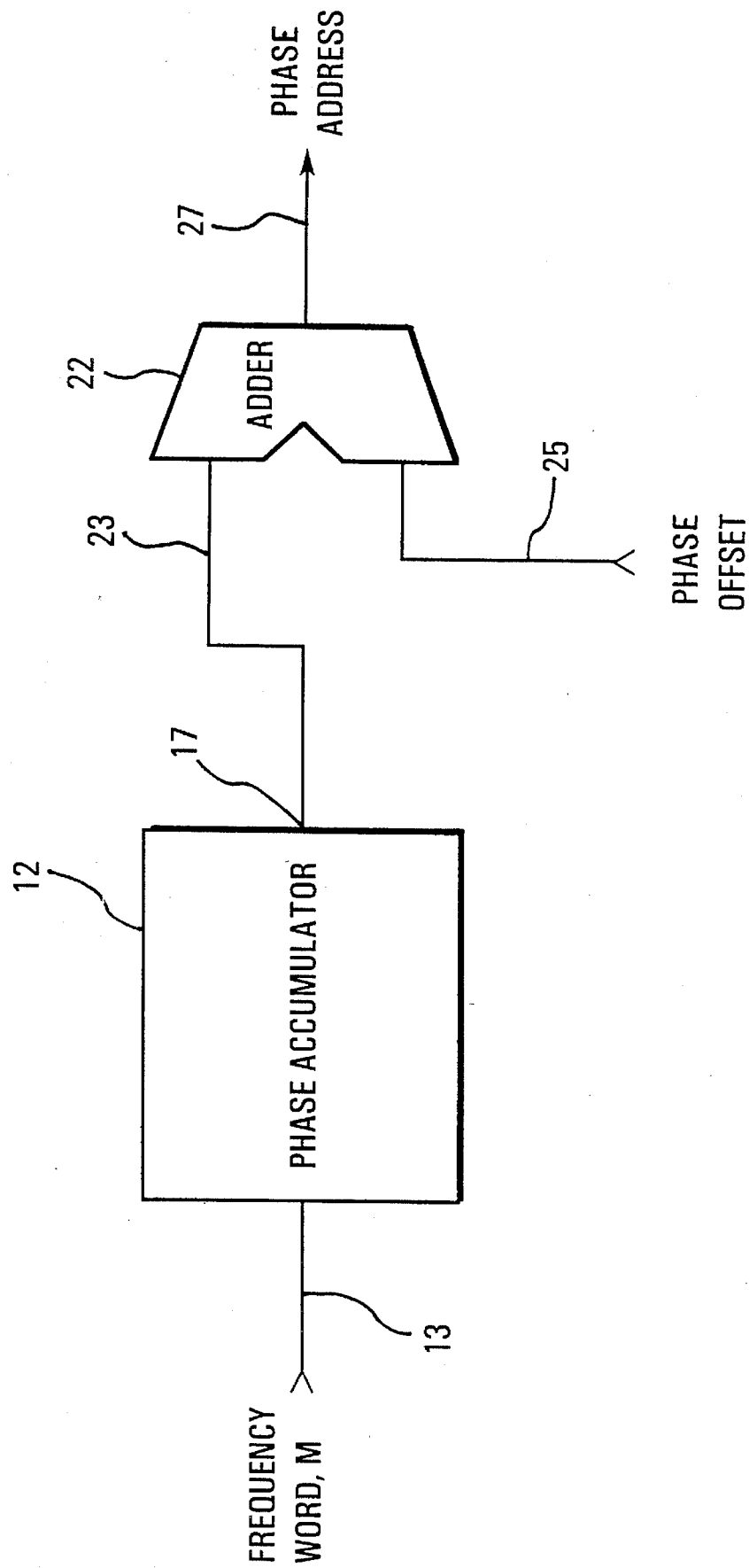
FIG. 3 is a block schematic diagram of the improvement to the FIG. 1 DDFS in accordance with the principles of the invention.

FIG. 3 illustrates in block/schematic diagram form the improvement to the DDFS described in FIG. 1 which allows one to be able to change the phase of the individual RF source while maintaining a frequency that is phase locked to the other sources.

In this embodiment, phase accumulator 12 is constructed as described herein above in connection with FIG. 1. The phase register output terminal 17 is connected via a line 23 to an input of a second digital adder 22. The output of adder 22 appears on line 27 and is supplied to memory 14 in the manner described in FIG. 1.

In order to introduce a desired phase shift in the output of the DDFS a digital word corresponding to the desired phase shift is supplied via line 25 to the other input of adder 22. This will have the effect of causing the address being supplied to memory 14 to be shifted by the amount supplied to the adder. Since the change in the address per clock cycle does not change, the frequency generated by the DDFS does not change as well. The effect of supplying the phase offset signal via line 25 is to shift the starting point on the sinusoidal wave form thus shifting its phase. The result is to produce a phase shifted DDFS in accordance with the principles of this invention.

Figure 4:
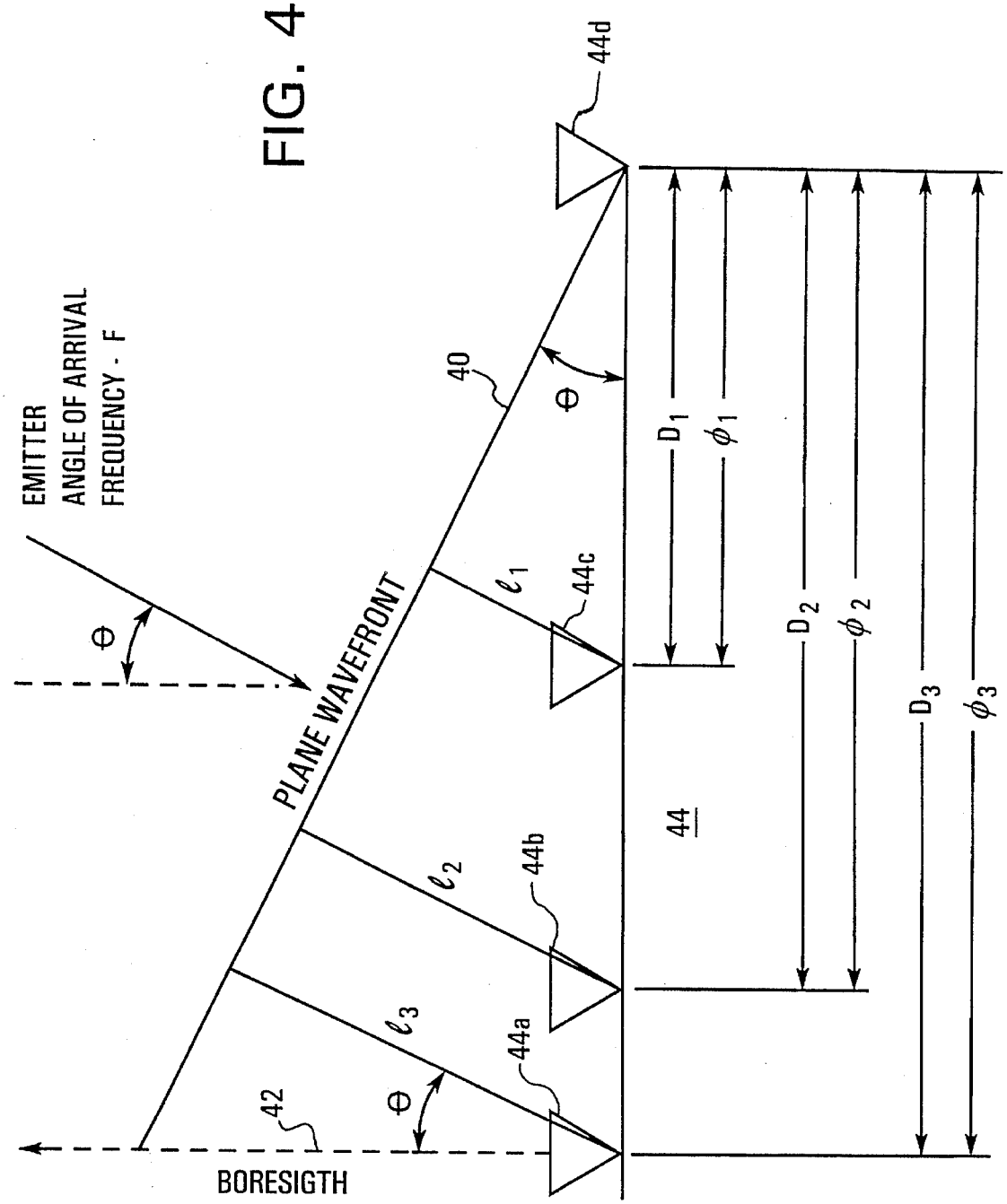
FIG. 4 is a schematic diagram of a typical antenna array for an interferometer-type receiver of the type to be tested with an apparatus constructed according to the principles of the invention.

In order to allow for a better understanding of the environment to which the invention is directed, FIG. 4 illustrates in diagrammatic form an antenna array for a typical interferometer type receiver. In this example, a four channel or three baseline interferometer array 44 is shown. A plane wave front illustrated by the line 40 is emitted by an emitter (not shown) which is at an angle θ off the boresight 42 of antenna array 44 formed by antennas 44a, 44b, 44c and 44d. This will have the effect of producing phase shifts at each of the antennas 44c, 44b and 44a as a function of θ, the frequency of the emitter and the spacings between the four antennas. The equation describing the phase shift at each antenna relative to the phase of the antenna 44d is:

$$\phi_n = 2\pi f \frac{Dn}{c} \sin\theta$$

where Dn is the distance between one of the other antennas and antenna 44d; θ is the angle to the emitter; f is the frequency of the emitter and C is the speed of light. Note that for a four channel interferometer 3 phase shifts are set up by the incoming emitter. These three phases are mathematically related to the antenna spacings since for a given emitter and direction of arrival D is the only variable. Thus, the value of the phase modulated DDFS constructed in accordance with the principles of the invention for simulating each of these phase shifts can readily be seen.

Figure 5:
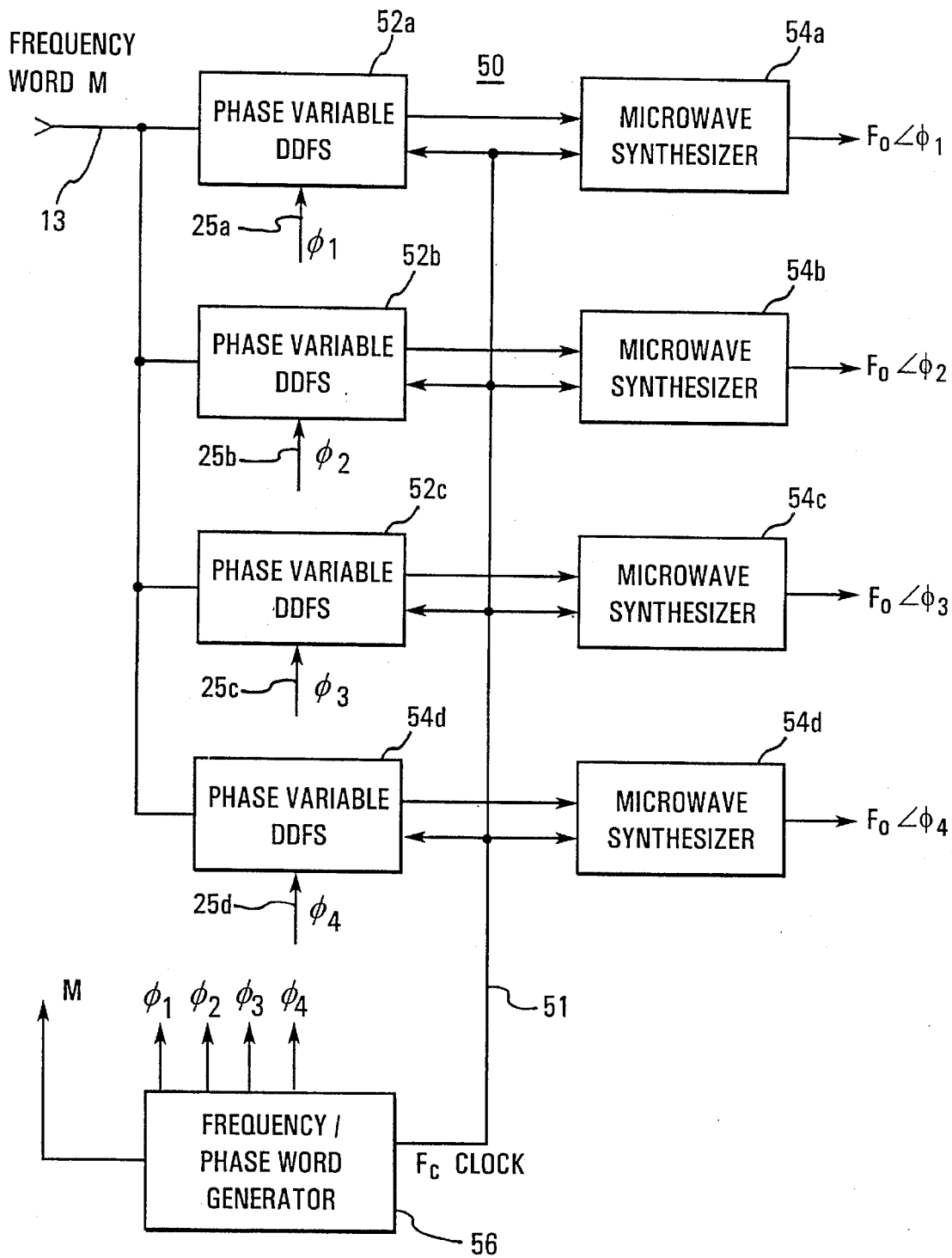
FIG. 5 is a block schematic diagram of a preferred embodiment constructed according to the principles of the invention of a frequency and phase variable simulator of an emitter environment for testing the interferometer of FIG. 4.

FIG. 5 is a block schematic diagram illustrating a system for providing a simulation of an emitter such as the one illustrated in FIG. 4 and constructed according to the principles of this invention. In this example, in order to provide the phase relationship described in FIG. 4 there are provided a 4 microwave frequency synthesizers 54a through d. Each of these are of conventional construction designed to generate signals in the frequency band of interest. Each synthesizer is respectively, provided with a phase variable DDFS 52a through d. Each of the phase variable DDFS circuits is provided with phase offset information via its respective input 25 as described in connection with FIG. 3.

The frequency word M and the phase offset information to be provided to inputs 25a through d are supplied from a frequency/phase word generator 56 containing an internal reference clock source and appropriate circuitry for producing the digital information described herein above.

In operation, the frequency of the emitter is chosen and the digital number M describing this frequency is supplied by a line 13 to each DDFS 52a through d. An angle θ is chosen, and the four phase shifts are calculated and supplied to inputs 25a through d. This produces the result that the four microwave synthesizers 54a through d are supplying identical frequency signals, but signals having phases that differ by the exact amount as that produced by an emitter having a plane wave front arriving at θ degrees off boresight. Depending on the sophistication of the system generating the emitter parameters an entire scenario sequence could be generated with many emitters producing signals arriving from arbitrary directions since changing the frequency and phase of each emitter can be done with relative ease and in matters of nanoseconds.

The principles of this invention are described herein above with reference to a preferred embodiment constructed accordingly. It is to be understood that the description is only of an example and the example may be changed or modified within the scope of the invention as defined by the appended claims.

I claim:

1. A multi-output frequency and phase variable signal source having selectively variable phase relationships between outputs for simulating a complex wavefront, comprising:

a plurality of first frequency synthesizers each operating at the same output frequency, and a plurality of second direct digital frequency synthesizers, each of which supplies selectively variable phase shift information to a respective one of said first frequency synthesizers for initiating its operation at a phase differing from that of the others of said first frequency synthesizers thereby producing a plurality of outputs from said first synthesizers at the same frequency and at predetermined differing phases, said second direct digital frequency synthesizers each comprising:

a. phase accumulator means including a phase register for receiving a clock signal and digital information corresponding to a frequency of operation and synchronously producing a digital output corresponding to a predetermined value of a sinusoid at a phase designated by the digital output, and including a first adder having inputs for receiving, respectively, a digital word corresponding to a frequency and the phase register digital output, the output of said first adder being coupled to an input of said phase register, b. memory means for storing predetermined values of a sinusoid at phases designated respectively, by phase addresses corresponding to the digital output from said phase accumulator means, c. means for producing a second digital word corresponding to a predetermined phase shift for producing a phase address output used to select an address in the memory means containing the sinusoidal value for the waveform at the point indicated by the desired phase shift input, d. second adder means for receiving the digital output from said phase accumulator means and said second digital word corresponding to a predetermined phase shift, the output of said second adder means supplying to said memory means an address therein shifted by a value corresponding to said second digital word and e. digital to analog converter means for producing an analog waveform output corresponding to the value selected by the phase address output supplied to said memory means, the output from said digital to analog converter means being supplied to said first frequency synthesizer connected, respectively, to the second direct digital frequency synthesizer for producing a predetermined phase of operation thereof.

* * * * *